Patented July 19, 1932

1,867,879

UNITED STATES PATENT OFFICE

JAMES BARRET CROCKETT, OF CAMBRIDGE, MASSACHUSETTS, ASSIGNOR TO CAMBRIDGE RUBBER COMPANY, OF CAMBRIDGE, MASSACHUSETTS, A CORPORATION OF MASSACHUSETTS

MANUFACTURE OF RUBBER FOOTWEAR

No Drawing.  Application filed May 14, 1929.  Serial No. 363,093.

This invention relates to an improved method of manufacturing rubber footwear. More specifically, it comprises a method of manipulating and dipping a former of the shape desired in an aqueous suspension or dispersion of rubber to produce a shoe or similar article of footwear, having superior qualities in wear and appearance. It also contemplates the article produced by the process.

The objects, briefly stated, are an improved and economical method of forming a specially soled shoe or similar article of footwear at low cost; to produce such article entirely by a sequence of dipping operations thus simplifying production and eliminating operations, and to produce a dipped shoe of improved appearance and having shape retaining and wear resisting qualities.

A suitable former would be a last of the shape desired of metal, wood, glass, porcelain or any other like material and may be smooth and highly polished, or of variated surface with grooves, designs or ornamental patterns raised or sunk in the surface.

The former is successively dipped in an aqueous suspension or dispersion of rubber, removed and dried between coats to the extent necessary or desired until the required thickness of deposited rubber is obtained, when the shoe is then stripped from the former and turned inside out, as hereinafter more fully described.

The aqueous suspension of rubber employed may consist of a vulcanizable latex mix, i. e., rubber latex in natural, concentrated, purified, thickened or stabilized form or treated in any way desired, containing vulcanizing ingredients, and an accelerator or accelerators active at normal or at elevated temperatures. Such mixes may contain fillers, reinforcing matter, pigments and colors, to produce the required physical wearing, and aging properties in the deposited rubber. After the article is formed by dipping in such a vulcanizable latex mix, vulcanization will of course be resorted to at a suitable stage of the process, preferably before stripping from the form, and may be effected at normal or elevated temperatures in dry heat, steam or hot water, or any of the known ways convenient. Alternatively the article may be formed from a latex mix and vulcanized by the application of sulphur chloride.

The aqueous suspension of rubber may also consist of pre-vulcanized rubber latex such as obtained in following the procedure disclosed in U. S. Patents Nos. 1,443,149 dated January 23, 1923 and 1,682,857 dated September 4, 1928. Such pre-vulcanized latex compounded or not with fillers, pigments, dyes and like material is preferred in most instances on account of the ease and exactness of control of the degree of cure. It may be obtained in stabilized form in the most suitable concentration, viscosity, and degree of cure for forming each specific part, thus varying the physical properties of different parts of the shoe and reducing the number of dips required, facilitating handling and further speeding up production by eliminating the step of vulcanization after the article is formed. The properties of the rubber deposited from such pre-vulcanized latex are of the highest order.

Aqueous dispersions of previously coagulated or reclaimed rubber artificially obtained by mechanical and/or chemical means may also be employed where their properties permit, and in either a vulcanized or unvulcanized condition.

The dipping operation may be carried out by hand or by mechanical means and details of dipping, draining and drying are not further referred to as they will be well understood by those skilled in the art.

The process consists of forming the sole first, then the body of the shoe, and lastly, if desired, a reinforcing coat or coats which will come on the inside of the shoe, drying and/or vulcanizing and turning the shoe inside out. During the process the sole and outside of the shoe will be formed first and next to the mould and the coating applied last will become the inside.

To form the sole, the former is dipped into the aqueous rubber containing material or compound only so far as it is desired the sole shall extend, i. e., the toe and ball of the foot portion of the former are coated, which coating may extend to a determined height on the side of the former, or the whole or part of the bottom of the former are immersed to the desired depth. The operation may be repeated until the desired thickness is obtained. Usually with an aqueous compound containing rubber and fillers a viscosity may be maintained so that the desired thickness of coating to form a sole for light articles may be obtained in one to three dips. Good wearing and abrasive resistance are desirable for the sole and the herein described method provides a means for varying the properties of the rubber in the sole, body and lining of the shoe by dipping into different compounds, i. e., compounds containing different proportions or kinds of fillers and/or in the case of prevulcanized latex varying degrees of cure. Generally it is desirable to have the sole compound contain a comparatively higher proportion of mineral fillers than the body to give stiffness, shape and wear in the deposited rubber composition when dried, but the compound used for the sole may of course be the same as the body for some classes of footwear. A suitable compound for forming a sole for light footwear is vulcanized latex rubber (dry weight) 58, zinc oxide 25, clay 15, carbon black 2. The sole compound may be the same color as the body or may be colored differently.

After the sole has been formed, the body is next dipped over the sole coats and such body may be formed in such shape, height and thickness as has been previously determined and may be of any suitable compound to give the required properties in the deposited rubber. A suitable compound for forming the body is vulcanized latex rubber (dry weight) 81, barytes 12, zinc oxide 5, chrome yellow 1, red oxide ½, carbon black ½. The last coat may be of a color to contrast with the first, or other part of the finished shoe.

After the body has been formed by one or more dips to obtain the desired thickness, a light lining and reinforcing coating if desired may be applied by one or two dips in a mix of the same or contrasting color. This lining and reinforcing coating, which is eventually on the inside, is usually applied to only the lower portion of the formed body. The shoe eventually is stripped from the former and turned inside out. The surplus rubber around the top or edge may be cut away either before or after removal from the former, and suitable trimming, beads or designs may be applied. Sometimes it is desirable to improve the qualities of some latex rubbers by extracting all or a part of the water soluble material present in the rubber and where it is found that the properties required are more nearly obtained by this procedure, the finished article may be extracted by treatment in warm or hot water for the periods and at the temperatures found necessary. I have found that immersion of the article in boiling water for a period of from two to four hours is sufficient. In any case the article may be subsequently varnished or given other surface treatment.

The former used in carrying out the process may have grooves, recesses, figures or designs, cut, moulded, sunk in, or raised, or attached to its surface as described in my copending application Serial No. 363,098, filed May 14, 1929, and in this event a fully trimmed, reinforced, ornamented and completed article will be obtained entirely by the dipping method herein described.

What I claim is:—

1. The process of making an article of rubber footwear which consists in first creating a sole portion by contacting a former with an aqueous rubber containing material, subsequently creating a body portion by contacting the former with an aqueous rubber containing material, removing the formed article and turning the same inside out to obtain the normal condition of use.

2. The process of making an article of rubber footwear which consists in independently creating a sole portion by application of an aqueous rubber containing material to a former as by dipping the former to a limited extent into said material, creating a body by subsequent dipping of the former into aqueous rubber containing material, removing the article from the former and turning the same inside out to obtain the normal condition of use.

3. The process of making an article of rubber footwear which consists in independently creating a sole portion by application of an aqueous rubber containing material with a comparatively high proportion of mineral filler to a former as by dipping the former to a limited extent into said material, creating a body by subsequent dipping of the former into aqueous rubber containing material, removing the article from the former and turning the same inside out to obtain the normal condition of use.

4. The process of making an article of rubber footwear which consists in contacting a former to a limited extent with an aqueous rubber containing material to form a sole portion, subsequently contacting the former with an aqueous rubber containing material to form a complete body and further contacting the article on the former with another aqueous rubber containing material to produce a reinforcing coating.

5. The process of making an article of rubber footwear which consists in contacting a former to a limited extent with an aqueous rubber containing material to form a sole portion, subsequently contacting the former with an aqueous rubber containing material to form a complete body, further contacting the article of the former with another aqueous rubber containing material to produce a reinforcing coating, removing the article from the former and turning the same inside out to bring the said reinforcing coating into the position of an inside lining.

6. The process of making an article of rubber footwear by coating a former with successive coatings of aqueous rubber containing materials having different physical or color characteristics, first creating a definite sole portion, subsequently creating a body portion merged with the sole portion and extracting water soluble material from the coating by immersion in boiling water.

JAMES BARRET CROCKETT.